United States Patent
Arita et al.

[11] Patent Number: 5,990,226
[45] Date of Patent: Nov. 23, 1999

[54] AQUEOUS RESIN COMPOSITION AND CURING PROCESS

[75] Inventors: Yoshihiro Arita, Osaka; Kiyoshi Kawamura, Hyogo; Kenta Kanaida; Satoshi Yamada, both of Osaka, all of Japan

[73] Assignee: Nippon Shokubai Co., Ltd., Osaka, Japan

[21] Appl. No.: 08/004,890

[22] Filed: Jan. 21, 1993

[30] Foreign Application Priority Data

Jan. 20, 1993 [JP] Japan ................................. 5-007978

[51] Int. Cl.$^6$ .................................................. C08G 63/00
[52] U.S. Cl. ........................ 524/516; 524/236; 524/415; 524/416; 524/419; 524/707; 524/745; 524/808; 524/549; 525/204; 525/279; 156/331.2
[58] Field of Search ........................ 156/331.2; 524/236, 524/415, 416, 419, 516, 707, 745, 549, 808; 525/204, 279

[56] References Cited

U.S. PATENT DOCUMENTS

| | | | |
|---|---|---|---|
| 4,113,674 | 9/1978 | Miller et al. ............................... | 524/36 |
| 4,474,923 | 10/1984 | Keskey et al. ........................... | 524/458 |
| 4,474,942 | 10/1984 | Sano et al. ............................... | 524/606 |
| 4,579,937 | 4/1986 | Masuda et al. ........................... | 528/363 |
| 4,644,032 | 2/1987 | Keskey et al. ........................... | 524/516 |
| 4,737,410 | 4/1988 | Kantner .................................... | 524/516 |
| 4,837,302 | 6/1989 | Sano ........................................ | 528/407 |
| 4,988,762 | 1/1991 | Overbeek et al. ....................... | 526/310 |

FOREIGN PATENT DOCUMENTS

| | | | |
|---|---|---|---|
| 0146965 | 7/1985 | European Pat. Off. ................ | 525/204 |
| 3048493 | 7/1982 | Germany ................................ | 524/516 |
| 60-161427 | 8/1985 | Japan . | |

*Primary Examiner*—Andrew E. C. Merriam
*Attorney, Agent, or Firm*—McDermott, Will & Emery

[57] ABSTRACT

There is provided an aqueous resin composition which does not cause coagulation, can be cured at low temperature, and, by this curing, forms a coating superior in mechanical strength, water resistance, solvent resistance and adhesion to various substrates. The aqueous resin composition of this invention comprises an oxazoline group-containing polymer (A), a carboxyl group-containing polymer (B), and an acidic compound-amine salt catalyst (C). The curing is carried out by a reaction between the oxazoline group-containing polymer (A) and the carboxyl group-containing polymer (B) in the presence of the acidic compound-amine salt catalyst (C).

8 Claims, No Drawings

AQUEOUS RESIN COMPOSITION AND CURING PROCESS

FIELD OF THE INVENTION

The present invention relates to an aqueous resin composition which can be cured at ordinary temperature and, with this curing, forms a coating superior in mechanical strength, water resistance, solvent resistance, and adhesion to various substrates and thus, is useful in the fields of adhesives, paints, coatings, or printing ink and so forth. Also, the present invention relates to a curing process for making the aforementioned coating.

BACKGROUND OF THE INVENTION

The reaction between an oxazoline group and a carboxyl group is known in public and used to make a crosslinked polymer. There has been disclosed in U.S. Pat. No. 4,474,923 a self-curable latex composition consisting of a latex containing oxazoline groups and a latex containing carboxyl groups. This latex composition cures by a reaction of the oxazoline group with the carboxyl group.

On the other hand, there are known catalysts for producing a crosslinked resin from a bisoxazoline compound and a dicarboxylic acid. U.S. Pat. No. 4,474,942 has disclosed a process to make a crosslinked polymer by heating a mixture of the bisoxazoline compound and dicarboxylic acid in the presence of a catalyst such as esters of organic phosphorous acids, inorganic salts. The inorganic salts are halides, nitrates, sulfates, or chlorates of the metal salts of from monovalence to tetravalence. U.S. Pat. No. 4,579,937 has disclosed a process to make a crosslinked polymer by heating a mixture of the bisoxazoline compound and dicarboxylic acid in the presence of oxazoline ring-opening catalysts. The oxazoline ring-opening catalysts are strong acids, sulfonic acid esters, sulfuric acid esters, or organic halides. Japanese Official Patent Provisional Publication, showa 60-161427, has disclosed a process to obtain highly polymerized polyesters by a reaction of a saturated polyester containing a terminal carboxyl group with a bisoxazoline compound under a melted condition in the presence of quarternary ammonium salts.

The aforementioned latex composition is useful in the fields of adhesives, paints, coatings, printing ink and so forth and its suitability for practical use has been required. The curing reaction of the latex composition, especially, the curing reaction at low temperature is very slow to proceed. The curing reaction at low temperature is generally accelerated by a catalyst.

However, the aforementioned catalysts can not accelerate the reaction between the oxazoline group and the carboxyl group, especially the reaction at low temperature and, in certain cases, they cause coagulation the aqueous resin composition.

It is an object of the present invention to provide an aqueous resin composition which does not cause coagulation and can be cured at low temperature and, by this curing, forms a coating superior in mechanical strength, water resistance, solvent resistance, and adhesion to various substrates.

Furthermore, it is an object of the present invention to provide a curing process which can form a coating superior in mechanical strength, water resistance, solvent resistance, and adhesion to various substrates without causing coagulation of a reacting substance and at low temperature.

SUMMARY OF THE INVENTION

In order to solve the aforementioned objects, the present invention provides an aqueous resin composition containing an oxazoline group-containing polymer (A), a carboxyl group-containing polymer (B) and an acidic compound-amine salt catalyst (C).

In order to solve the aforementioned objects, the present invention provides a curing process comprising a reaction of the oxazoline group-containing polymer (A) with the carboxyl group-containing polymer (B) in the presence of the acidic compound-amine salt catalyst (C).

DETAILED DESCRIPTION

The oxazoline group-containing polymer (A) used in the present invention can be produced, for example, by carrying out a solution polymerization reaction or an emulsion polymerization of an addition-polymerizable oxazoline (a) and, as occasion demands, at least one kind of other monomers (b) in an aqueous medium according to a polymerization process hitherto-known in public.

The oxazoline group-containing polymer (A) used in the present invention is a polymer made by carrying out an addition polymerization reaction of the addition-polymerizable oxazoline (a) and, as occasion demands, at least one kind of other monomers (b).

The addition-polymerizable oxazoline (a) used in the present invention is such as represented by the under-described general formula (I).

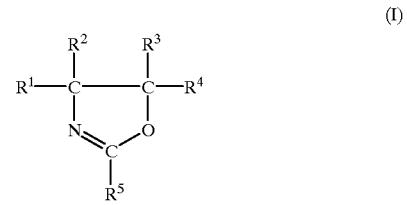

wherein $R^1, R^2, R^3$ and $R^4$ independently denote a hydrogen atom, halogen atom, an alkyl group, aralkyl group, a phenyl group or substituted phenyl group, and $R^5$ denotes a non-cyclic organic group having an addition-polymerizable unsaturated bond.

Practical examples are, for example, 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline; and one kind or a mixture of two or more kinds selected from these groups can be used. Among those, 2-isopropenyl-2-oxazoline is preferable because of its industrial availability.

An amount for use of the addition-polymerizable oxazoline (a) is not especially limited, but a preferable amount is 5% by weight or more in the oxazoline group-containing polymer (A). An amount of less than 5% by weight leads to an insufficient curing and, thence, there is a trend of damaging durability and water resistance.

The other monomer (b) of this invention is not especially limited as far as it is a monomer not reactive with an oxazoline group and capable of copolymerizing with the addition-polymerizable oxazoline (a) and, for example, (meth)acrylic acid esters such as methyl (meth)acrylate, butyl (meth)acrylate, 2-ethylhexyl (meth)acrylate, methoxypolyethylene glycol (meth)acrylate and the like; (meth) acrylic acid salts such as sodium (meth)acrylate, potassium (meth)acrylate, ammonium (meth)acrylate and the like; unsaturated nitrites such as (meth)acrylonitrile and the like; unsaturated amides such as (meth)acrylamide, N-methylol (meth)acrylamide and the like; vinyl esters such as vinyl acetate, vinyl propionate and the like; vinyl ethers such as methyl vinyl ether, ethyl vinyl ether and the like; α-olefins such as ethylene, propylene and the like; halogen-containing α, β-unsaturated monomers such as vinyl chloride, vinylidene chloride, vinyl fluoride and the like; α, β-unsaturated aromatic monomers such as styrene, α-methylstyrene and the like are preferred; and one kind or a mixture of two or more kinds of these compounds can be used.

The oxazoline group-containing polymer (A) can be used alone as one kind or by mixing two or more kinds.

The carboxylic group-containing polymer (B) used in this invention is not especially limited as far as it is a polymer containing a carboxyl group.

Examples of the carboxylic group-containing polymer (B) used in this invention are, for example, an acryl resin emulsion, a water-soluble or a water-dilutable acryl resin, a water-soluble or a water-dispersable perfluoroalkyl group-containing polymeric surfactant, a water-soluble or a water-dispersable polyester resin, a water-soluble or a water-dispersable polyurethane resin, a water-dispersable polyolefin resin and the like.

The carboxyl group-containing polymer (B) can be used alone as one kind or by mixing two or more kinds.

Concerning the oxazoline group-containing polymer (A) and the carboxyl group-containing polymer (B) in this invention, these may be contained in each other separated aqueous medium or both together in an aqueous medium.

In this invention, the formulation ratio of the oxazoline group-containing polymer (A) and the carboxyl group-containing polymer (B) is not especially limited, but for example, in an equivalent ratio of the oxazoline group to the carboxyl group, a range of from 20 vs. 1 to 1 vs. 20 is preferable. In a weight ratio of the polymer (A) and the polymer (B), a range of from 95 vs. 5 to 5 vs. 95 is preferable. In a case of deviating from this range, either of the oxazoline group and the carboxyl group is lacking, an effective crosslinking reaction is not performed, and there is a tendency to damage at least one of the mechanical strength, water resistance and solvent resistance of a cured coating.

Examples of the acidic compound, which is one ingredient of the acidic compound-amine salt catalyst (C) used as a catalyst in this invention, are inorganic acids such as phosphoric acid, phosphorous acid, hydrochloric acid, sulfuric acid, nitric acid and the like; and organic sulfonic acids such as methanesulfonic acid, p-toluenesulfonic acid and the like.

Examples of the amine, which is one ingredient of the acidic compound-amine salt catalyst (C) used as a catalyst in this invention, are ammonia, methylamine, dimethylamine, trimethylamine, ethylamine, diethylamine, triethylamine, butylamine, tributylamine, monoethanolamine, diethanolamine, triethanolamine, diethylethaolamine, ethylenediamine, N,N-dimethylethylenediamine, morpholine and the like.

A preferable equivalent ratio of an acidic compound to an amine, which constitute the acidic compound-amine salt catalyst (C) is 0.5 or more equivalents of the amine per one equivalent of the acidic compound. In a neutralization extent of less than this ratio, in many cases coagulation occurs during addition to an aqueous resin, so that the adding becomes impossible.

A preferable adding amount of the acidic compound-amine salt catalyst (C) in this invention is 0.1 to 10% by weight based on the total of resin components of the oxazoline group-containing polymer (A) and the carboxyl group-containing polymer (B). In an amount less than 0.1% by weight, the catalyst effect is practically lacking and the curing at low temperature is not attained and also, an amount more than 10% by weight is unpreferable because the water resistance and strength are badly affected when a coating being formed. Furthermore, these catalysts can be used alone or in combination of two or more kinds.

The aqueous medium usable in this invention is not especially limited as far as it is water or a mixture solvent of water and a solvent mixable with water. Solvents mixable with water are, for example, methanol, ethanol, propanol, isopropanol, butanol, tertiary-butanol, ethylene glycol, ethylene glycol monomethyl ether, ethylene glycol monobutyl ether, diethylene glycol, acetone, methyl ethyl ketone and the like.

The aqueous resin composition of this invention, as occasion demands, may be properly contain in a range of not damaging the objects of this invention, for example, a plasticizer such as phthalic acid esters and the like; a filler such as calcium carbonate, talc, clay, mica and the like; a pigment such as carbon black, titanium white, zinc white, iron oxide red, phthalocyanine and the like; a dye; a thickener such as polyvinyl alcohol, hydroxyethylcellulose, starch and the like; a dispersant; a humectant; a deforming agent such as silicone and the like.

In the aqueous resin composition of this invention, the polymer (A), polymer (B) and catalyst (C) may be separately packed, the polymer (A) and polymer (B) may be mixed beforehand, at least one of the polymer (A) and polymer (B) may be mixed beforehand with the catalyst (C) or the polymers (A), (B) and catalyst (C) may be mixed beforehand.

The process for producing the aqueous resin composition of this invention is not especially limited and any means commonly used by concerned manufacturers can be used widely. For example, a solution or a dispersion of the polymer (A), a solution or a dispersion of the polymer (B), and a solution, a dispersion, or a powder of the catalyst (C) are mixed and, if necessary, may be mixed with adding the aforementioned additive. Here, the solution is a solution in which a solute is dissolved in an aqueous medium, and the dispersion is a dispersed solution in which a dispersing matter is dispersed in an aqueous medium. The dispersion denotes such as called as suspension, emulsion, latex and so forth. Meanwhile, it is unnecessary to contain water in a solution and dispersion of the catalyst (C).

The aqueous resin composition of this invention can form a coating by attaching it to substrates such as paper, a plastic film, a plastic molding, fiber, metal, nonwoven fabric and so forth followed by drying. For attaching the resin composition to the substrates, any means commonly used by concerned manufacturers, for example, means such as coating and immersing can be adopted. The drying can be carried out at high temperature like with heating as well as at low temperature like ordinary temperature.

The aqueous resin composition of this invention cures with a reaction of the oxazoline group, which the polymer (A) has, with the carboxyl group which the polymer (B) has. The reaction is accelerated by the acidic compound-amine salt catalyst (C) not only at high temperature, but also at low temperature. Because of this fact, the aqueous resin composition of this invention forms, by curing during a shorter time than before and/or at lower temperature, a coating superior in mechanical strength, water resistance, solvent resistance and adhesion to various substrates. In addition, since the acidic compound-amine salt catalyst (C) does not cause coagulation in an aqueous medium, the aqueous resin composition of this invention does not give a bad effect due to coagulation.

EXAMPLES

Although the following examples show the contents of this invention typically, this invention is not limited in a range of these examples. Meanwhile, unless otherwise stated, the "part" represents "part by weight" and the "%" "% by weight".

Productive Example 1
Production of the oxazoline group-containing polymer (A)

Into a flask equipped with a stirrer, reflux condenser, nitrogen-introducing tube, and thermometer were charged 782.4 parts of deionized water and 128 parts of a 15% aqueous solution of HITENOL N-08 (polyoxyethylen enonylphenyl ether sulfuric acid ammonium salt, made by Dai-ichi Kogyo Seiyaku Co., Ltd.) and the obtained mixture was adjusted to 9.0 by a proper amount of ammonia water (28%) and heated to 70° C. with introducing nitrogen gas slowly. Therein, 64 parts of a 5% aqueous solution of potassium persulfate was injected, then a monomer mixture composed of 288 parts of butyl acrylate, 288 parts of styrene and 64 parts of 2-isopropenyl-2-oxazoline and prepared beforehand was added dropwise during 3 hours. In the course of reaction, the nitrogen gas was run continuously and the temperature in the flask was kept at 70±1° C. After the dropping finished, the same temperature was maintained for 2 hours and then, the inner temperature was raised up to 80° C. and stirring continued 1 hour to complete the reaction. Then, by cooling, there was obtained an aqueous dispersion of an oxazoline group-containing polymer (A1) having 39.8% of a nonvolatile component and showing pH 8.0.

Productive Example 2
Production of the oxazoline group-containing polymer (A)

Into a flask similar to that used in the productive example 1 were charged 116 parts of deionized water and 4 parts of V-50 [2,2'-azobis(2-amizinopropane) dihydrochloride, that is a polymerization intiator made by Wako Pure Chemical Industries, Ltd. and the obtained mixture was heated to 70° C. with introducing nitrogen gas slowly. Therein, a monomer mixture composed of 48 parts of methoxypolyethylene glycol acrylate (on the average, ethylene glycol nonamer; a NK ester AM-90G made by Shinnakamura Chemical Industries, Co., Ltd. and 32 parts of 2-isopropenyl-2-oxazoline and prepared beforehand was added dropwise through a dropping funnel during 1 hour. In the course of reaction, the nitrogen gas was run continuously and the temperature in the flask was maintained at 70±1° C. After the dropping finished, the same temperature was kept for 6 hours and then, by cooling there was obtained an aqueous solution of an oxazoline group-containing polymer having 41.5% of a non-volatile component and showing pH 7.0 (A2).

Productive Example 3
Production of the carboxyl group-containing polymer (B)

Into a flask similar to that used in the productive example 1 were charged 782.4 parts of deionized water and 128 parts of a 15% aqueous solution of HITENOL N-08 and the obtained mixture was heated to 70° C. with introducing nitrogen gas slowly. Therein, 64 parts of a 5% aqueous solution of potassium persulfate was injected, then a monomer mixture composed of 320 parts of butyl acrylate, 288 parts of styrene and 32 parts of acrylic acid and prepared beforehand was added dropwise during 3 hours. In the course of reaction, the nitrogen gas was run continuously and the temperature in the flask was maintained at 70±1° C. After the dropping finished, the same temperature was kept for 2 hours and then, the inner temperature was raised up to 80° C. and the stirring continued for 1 hour to complete reaction. Then, by cooling and by adjusting pH at 8.5 with adding a proper amount of ammonia water(28%), there was obtained an aqueous dispersion of a carboxyl group-containing polymer (B1) having 39.8% of a non-volatile component.

[Other carboxyl group-containing polymers (B) used]

Acryl resin aqueous solution (B2): AROLON 453 (non-volatile component 50%, made by NiPPON Shokubai Co., Ltd.

Polyester aqueous dispersion (B3):FINETEX ES-675 non-volatile component 37%, made by Dainippon Ink and Chemicals, Inc.

[acidic compound-amine salt catalysts (C) used]

(C1) 5% aqueous solution of diammonium hydrogen phosphate (C2) 5% aqueous solution of ammonium chloride (C3) 5% aqueous solution of ammonium phosphite obtained by adding an equivalent amount of ammonia water to phosphorous acid followed by diluting it with water.

(C4) 5% aqueous solution of ammonium p-toluenesulfonate obtained by adding an equivalent amount of aqueous ammonia to p-toluenesulfonic acid followed by diluting it with water.

(C5) 5% aqueous solution of a triethylamine salt of phosphorous acid obtained by adding a 0.5 equivalent amount of triethylamine to phosphorous acid followed by diluting it with water.

[Comparative catalysts (D)]

(D1) 5% aqueous solution of phosphoric acid (D2) 5% aqueous solution of phosphorous acid (D3) 5% aqueous solution of p-toluenesulfonic acid (D4) 5% aqueous solution of tetrabutylammonium chloride

Examples 1 to 5 and Comparative Examples 1 to 5

With formulation shown in Table 1, the aqueous resin compositions (1) to (5) of present invention were prepared by mixing the aqueous polymer dispersion (A1), the aqueous polymer dispersion (B1) and the acidic compound-amine salt catalyst (C). As shown in Table 1, the aqueous resin compositions for comparison (1) to (5) were prepared by a procedure similar to that used in the examples 1 to 5, except that the catalyst (C) was not added or the comparative catalyst (D) was used instead of the catalyst (C).

The above-described aqueous resin compositions were casted on a tetrafluoroethylene resin plate under conditions of 23±2° C. and 65±3% RH and stood for 4 days to prepare films of about 0.3 mm in film thickness. Obtained films were used as specimens with which the following tests were carried out. Results are shown in Table 1.

(1) Mixing performance

The state in mixing the catalyst was judged by the naked eye according to the under-described standards.

Excellent: no change when compared with the state of before mixing.

Bad: formation of coagulation was observed by mixing and the film can not be made.

(2) Solvent resistance

The specimens were immersed in toluene at room temperature for 24 hours and their degree of swelling was calculated according to the following equation. As the degree of swelling is smaller, the solvent resistance is better.

degree of swelling(%)=[( weight after immersion−weight before immersion )/(weight after immersion followed by drying)]×100

TABLE 1

| (formulation is based upon convertin non-volatile conponent) | | | Example | | | | | Comparative Example | | | | |
|---|---|---|---|---|---|---|---|---|---|---|---|---|
| | | | 1 | 2 | 3 | 4 | 5 | 1 | 2 | 3 | 4 | 5 |
| Formulation (part) | oxazoline group-containing polymer (A) | (A 1) | 20 | 20 | 20 | 20 | 20 | 20 | 20 | 20 | 20 | 20 |
| | carboxyl group-containing polymer (B) | (B 1) | 80 | 80 | 80 | 80 | 80 | 80 | 80 | 80 | 80 | 80 |
| | acidic compound-amine salt catalyst (C) | (C 1) | 2 | — | — | — | — | — | — | — | — | — |
| | | (C 2) | — | 2 | — | — | — | — | — | — | — | — |
| | | (C 3) | — | — | 2 | — | — | — | — | — | — | — |
| | | (C 4) | — | — | — | 2 | — | — | — | — | — | — |
| | | (C 5) | — | — | — | — | 2 | — | — | — | — | — |
| | comparative catalyst (D) | (D 1) | — | — | — | — | — | — | 2 | — | — | — |
| | | (D 2) | — | — | — | — | — | — | — | 2 | — | — |
| | | (D 3) | — | — | — | — | — | — | — | — | 2 | — |
| | | (D 4) | — | — | — | — | — | — | — | — | — | 2 |
| mixing performance | | | excellent | excellent | excellent | excellent | excellent | — | bad | bad | bad | excellent |
| solvent resistance (%) | | | 830 | 870 | 900 | 1050 | 980 | 2100 | — | — | — | 2210 |

Examples 6 to 10 and Comparative Examples 6 to 10

With formulation shown in Table 2, the aqueous resin compositions (6) to (10) of present invention were red by mixing the aqueous polymer solution (A2), the aqueous polymer dispersion (B1) and the acidic compound-amine salt catalyst (C). As shown in Table 2, queous resin compositions for comparison (6) to (10) were prepared by a procedure similar to that used in the examples 6 to 10, except that the catalyst (C) was not added or the comparative catalyst (D) was used instead of the catalyst (C).

The above-described aqueous resin compositions were casted on a tetrafluoroethylene resin plate under conditions of 23±2° C. and 65±3% RH and stood for 4 days to prepare films of about 0.3 mm in film thickness. Obtained films were used as specimens with which the owing tests were carried out. Results are shown in Table 2.

(1) Mixing performance

Judgement was carried out according to the above-described method.

(2) Solvent resistance

Degree of swelling was calculated according to the above-described method.

(3) Film strength

Measured with 5 cm/minute of tensile apeed using a Instron testing machine.

(4) Water-resistant strength

After immersing in water at room temperature for 24 hours, the film strength was measured by a method similar to (3).

TABLE 2

| (formulation is based upon convertin non-volatile conponent) | | | Example | | | | | Comparative Example | | | | |
|---|---|---|---|---|---|---|---|---|---|---|---|---|
| | | | 6 | 7 | 8 | 9 | 10 | 6 | 7 | 8 | 9 | 10 |
| Formulation (part) | oxazoline group-containing polymer (A) | (A 1) | 10 | 10 | 10 | 10 | 10 | 10 | 10 | 10 | 10 | 10 |
| | carboxyl group-containing polymer (B) | (B 1) | 90 | 90 | 90 | 90 | 90 | 90 | 90 | 90 | 90 | 90 |
| | acidic compound-amine salt catalyst (C) | (C 1) | 2 | — | — | — | — | — | — | — | — | — |
| | | (C 2) | — | 2 | — | — | — | — | — | — | — | — |
| | | (C 3) | — | — | 2 | — | — | — | — | — | — | — |
| | | (C 4) | — | — | — | 2 | — | — | — | — | — | — |
| | | (C 5) | — | — | — | — | 2 | — | — | — | — | — |
| | comparative catalyst (D) | (D 1) | — | — | — | — | — | — | 2 | — | — | — |
| | | (D 2) | — | — | — | — | — | — | — | 2 | — | — |
| | | (D 3) | — | — | — | — | — | — | — | — | 2 | — |
| | | (D 4) | — | — | — | — | — | — | — | — | — | 2 |
| mixing performence | | | excellent | excellent | excellent | excellent | excellent | — | bad | bad | bad | excellent |
| solvent resistance (%) | | | 760 | 870 | 950 | 1000 | 970 | 1510 | — | — | — | 1530 |
| Film strength (kg/cm²) | | | 21.5 | 19.2 | 19.1 | 18.5 | 19.3 | 16.1 | — | — | — | 15.8 |
| Water-resistant strength (kg/cm²) | | | 15.6 | 14.1 | 13.9 | 13.5 | 14.1 | 5.7 | — | — | — | 5.2 |

Examples 11 to 13 and Comparative Examples 11 to 13

With formulation shown in Table 3, the aqueous resin compositions (11) to (13) of present invention were prepared by mixing the aqueous polymer solution (A2), the aqueous polymer solution (B2) and the acidic compound-amine salt catalyst (C). As shown in Table 3, the aqueous resin compositions for comparison (11) to (13) were prepared by a procedure similar to that used in the examples 11 to 13, except that the catalyst (C) was not added or the comparative catalyst (D) was used instead of the catalyst (C).

The above-described aqueous resin compositions were casted on a glass plate under conditions of 23±2° C. and 65±3% RH and stood for 4 days to prepare coated films of about 0.01 mm in film thickness. Obtained coated films were used as specimens with which the following tests were carried out. Results are shown in Table 3.

(1) Mixing performance

Judgement was carried out according to the above-described method.

(2) Rubbing test

Obtained coated films were rubbed 30 times by absorbent cotton wet with water and, after this treating, the state of coated films were judged by the naked eye according to the under-described standards.

Excellent: no change
Good: scratch was observed on coated films.
Somewhat bad: did not dissolve, but peeled off and crumbled to pieces.
Bad: completely dissolved.

TABLE 3

| (formulation is based upon convertin non-volatile component) | | | Example | | | Comparative Example | | |
|---|---|---|---|---|---|---|---|---|
| | | | 11 | 12 | 13 | 11 | 12 | 13 |
| Formulation (part) | oxazoline group-containing polymer (A) | (A 2) | 30 | 30 | 30 | 30 | 30 | 30 |
| | carboxyl group-containing polymer (B) | (B 2) | 70 | 70 | 70 | 70 | 70 | 70 |
| | acidic compound-amine salt catalyst (C) | (C 1) | 2 | — | — | — | — | — |
| | | (C 2) | — | 2 | — | — | — | — |
| | | (C 3) | — | — | 2 | — | — | — |
| | comparative catalyst (D) | (D 2) | — | — | — | — | 2 | — |
| | | (D 4) | — | — | — | — | — | 2 |
| Mixing performence | | | excellent | excellent | excellent | — | bad | excellent |
| Rubbing test | | | excellent | good | excellent | somewhat bad | — | somewhat bad |

Examples 14 to 16 and Comparative Examples 14 to 16

With formulation shown in Table 4, the aqueous resin compositions (14) to (16) of present invention were prepared by mixing the aqueous polymer solution (A2), the aqueous polymer dispersion (B3) and the acidic compound-amine salt catalyst (C). As shown in Table 4, the aqueous resin compositions for comparison (14) to (16) were prepared by a procedure similar to that used in the examples 14 to 16, except that the catalyst (C) was not added or the comparative catalyst (D) was used instead of the catalyst (C).

The above-described aqueous resin compositions were casted on a tetrafluoroethylene plate under conditions of 23±2° C. and 65±3% RH and stood for 4 days to prepare films of about 0.1 mm in film thickness. Obtained films were used as specimens with which the following tests were carried out. Results are shown in Table 4.

(1) Mixing performance

Judgement was carried out according to the above-described method.

(2) Water resistance

The specimens were immersed in water at room temperature for 24 hours and their degree of swelling was calculated according to the following equation and variation on outside appearance change of films were judged by the naked eye according to the following standards. As the degree of swelling is smaller, the water resistance is better.

degree of swelling(%) [(weight after immersion−weight before immersion)/(weight after immersion followed by drying)]×100

Standards to judge appearance
Excellent: no change.
Good: somewhat chalked.
Bad: chalked.

TABLE 4

| (formulation is based upon convertin non-volatile component) | | | Example 14 | Example 15 | Example 16 | Comparative Example 14 | Comparative Example 15 | Comparative Example 16 |
|---|---|---|---|---|---|---|---|---|
| Formulation (part) | oxazoline group-containing polymer (A) | (A 2) | 10 | 10 | 10 | 10 | 10 | 10 |
| | carboxyl group-containing polymer (B) | (B 3) | 90 | 90 | 90 | 90 | 90 | 90 |
| | acidic compound-amine salt catalyst (C) | (C 1) | 2 | — | — | — | — | — |
| | | (C 2) | — | 2 | — | — | — | — |
| | | (C 3) | — | — | 2 | — | — | — |
| | comparative catalyst (D) | (D 2) | — | — | — | — | 2 | — |
| | | (D 4) | — | — | — | — | — | 2 |
| Mixing performence | | | excellent | excellent | excellent | — | bad | excellent |
| Water resistance | degree of swelling (%) | | 400 | 450 | 420 | 840 | — | 900 |
| | outside appearance | | excellent | good | excellent | bad | — | bad |

The aqueous resin composition of this invention is capable of curing at low temperature such as ordinary temperature and, by this curing, forms a coating superior in mechanical strength, water resistance, solvent resistance and adhesion to various substrates. Accordingly, the aqueous resin composition of this invention can be used in industrial practice in the fields of an adhesives, paints, coatings, printing ink and so forth.

According to the curing process of this invention, a coating superior in mechanical strength, water resistance, solvent resistance and adhesion to various substrates can be made by a reaction at low temperature such as ordinary temperature.

We claim:

1. An aqueous resin composition comprising in an aqueous medium an oxazoline group-containing polymer (A), a carboxyl group-containing polymer (B), and an acidic compound-amine salt catalyst (C) in an amount of from 0.1 to 10% by weight based on the total weight of the oxazoline group-containing polymer (A) and the carboxyl group-containing polymer (B), the acidic compound from which the acidic compound-amine salt catalyst (C) is formed being at least one acid selected from the group consisting of phosphoric acid, phosphorous acid, hydrochloric acid, sulfuric acid, nitric acid and an organic sulfonic acid.

2. An aqueous resin composition as defined by claim 1, wherein the oxazoline group-containing polymer (A) is formed from 2-isopropenyl-2-oxazoline.

3. An aqueous resin composition as defined by claim 1, wherein the oxazoline group-containing polymer (A) contains at least 5% by weight of oxazoline-derived units.

4. An aqueous resin composition as defined by claim 1, comprising an equivalent ratio of oxazoline groups to carboxyl groups of from 1:20 to 20:1.

5. An aqueous resin composition as defined by claim 1, comprising a weight ratio of oxazoline-group containing polymer (A) to carboxyl-group containing polymer (B) of from 95:5 to 5:95.

6. An aqueous resin composition as defined by claim 1, wherein the acidic compound-amine salt catalyst (C) comprises at least 0.5 equivalents of amine per one equivalent of acidic compound.

7. A curing process, comprising reacting in an aqueous medium an oxazoline group-containing polymer (A) and a carboxyl group-containing polymer (B) in the presence of an acidic compound-amine salt catalyst (C) in an amount of from 0.1 to 10% by weight based on the total weight of the oxazoline group-containing polymer (A) and the carboxyl group-containing polymer (B), the acidic compound from which the acidic compound-amine salt catalyst (C) is formed being at least one acid selected from the group consisting of phosphoric acid, phosphorous acid, hydrochloric acid, sulfuric acid, nitric acid and an organic sulfonic acid.

8. A curing process, comprising providing in an aqueous medium a mixture of an oxazoline group-containing polymer (A) and a carboxyl group-containing polymer (B), and adding to the mixture an acidic compound-amine salt catalyst (C) in an amount of from 0.1 to 10% by weight based on the total weight of the oxazoline group-containing polymer (A) and the carboxyl group-containing polymer (B), the acidic compound from which the acidic compound-amine salt catalyst (C) is formed being at least one acid selected from the group consisting of phosphoric acid, phosphorous acid, hydrochloric acid, sulfuric acid, nitric acid and an organic sulfonic acid.

* * * * *